Dec. 26, 1967 W. M. TRIGGS 3,360,688

THIN FILM RESISTOR COMPOSED OF CHROMIUM AND VANADIUM

Filed March 11, 1965

INVENTOR.
WILLIAM M. TRIGGS
BY
Glenn H. Bonnette
Attorney

United States Patent Office 3,360,688

Patented Dec. 26, 1967

3,360,688

THIN FILM RESISTOR COMPOSED OF CHROMIUM AND VANADIUM

William M. Triggs, Raritan, N.J., assignor to Radio Corporation of America, a corporation of Delaware Filed Mar. 11, 1965, Ser. No. 438,952
6 Claims. (Cl. 317—101)

This invention relates generally to resistive elements and particularly to improved thin film resistive elements usable in integrated circuits, and the method of making the same.

It is desirable to make integrated circuits as small as possible and still provide components having good operating stability with time and variations in temperature. Resistive elements are important parts of integrated circuits. Since small areas and high precision are required for the whole circuit, it is desirable to be able to produce high value resistive elements with as small area as possible in a way to satisfy the requirement of high precision.

In the prior art there are two well known methods of making resistive elements for integrated circuits:

(1) Diffused resistors (applying only to monolithic semiconductor circuits) which display large junction capacitance and therefore need reversed biasing to reduce the capacitance.

(2) Thin film resistors, made by evaporating nichrome on glass or $SiO_2$, thereby providing a low capacitance to the substrate, through the insulating layer, but requiring a large area.

An object of the present invention is to provide improved integrated circuits.

Another object is to provide improved high value resistive elements in thin film form.

Still another object is to provide a resistive element in thin film form with improved resistance temperature coefficient.

Still a further object is to provide a resistive element in thin film form requiring relatively small area for relatively high values of resistance.

The foregoing objects are achieved by a resistive element prepared by evaporating a chromium-vanadium film onto an integrated circuit wafer or substrate and preferably by covering it with a thin protective film consisting of SiO, for example.

The novel features of this invention are set forth with particularity in the appended claims. The invention itself, however, will best be understood from the following description when read in connection with the accompanying drawings in which:

In referring to the drawings, like elements and parts are designated by like reference characters throughout the figures.

The resistive element herein described may be used with any kind of a substrate which is able to withstand the necessary evaporation temperature of the chromium-vanadium alloys which are used, with various suitable connections, and in any desirable shape. The example described below is only one of many possibilities.

Figure 1:
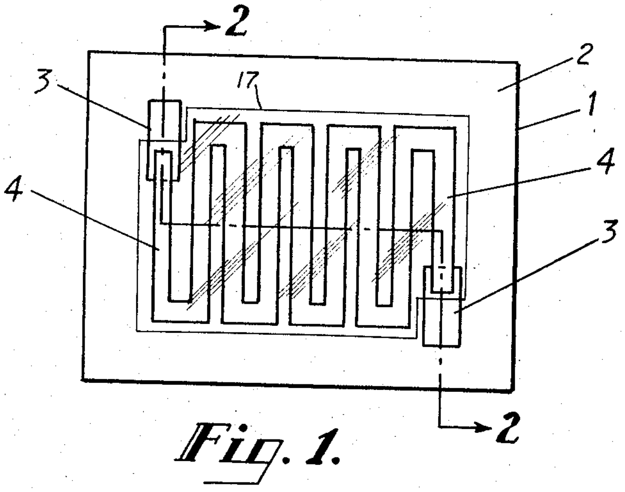
FIGURE 1 is a plan view, greatly enlarged, of a resistive element in accordance with the present invention.
Figure 2:
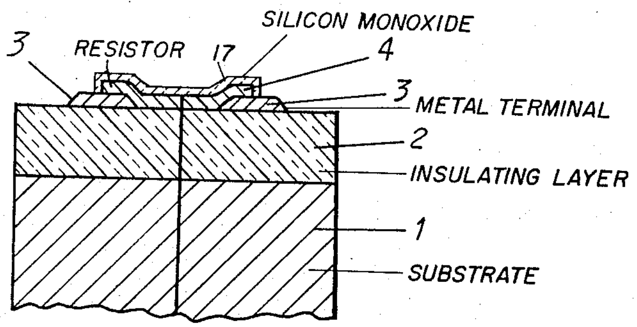
FIGURE 2 is a sectional view of the resistive element of FIGURE 1 taken on the section line 2—2.

FIGURES 1 and 2 illustrate a supporting substrate 1 covered with an insulating layer 2. It is not necessary to prepare the surface of the insulating layer 2 in any specific manner for the following steps of manufacture. The insulating layer 2 may comprise many insulating materials (preferably $SiO_2$ or glass) capable of withstanding the heat generated during the subsequently-described evaporation steps. The layer 2 is provided with terminals 3, preferably of aluminum at desired locations which may be applied using photoresist techniques. A photoresist mask is applied to all areas of the layer 2 except those on which it is desired to apply the terminals 3. Aluminum is then evaporated over the entire wafer; then the photoresist is removed and with it the aluminum from areas where it is not wanted, thereby leaving the terminals 3.

Next, a photoresist mask is applied over all areas of the layer 2 and terminals 3 except those areas which define the active resistor area 4. The mask is such that after the evaporation of the resistor material, the thin film resistor 4 partly covers the terminals 3 in order to provide connection. Resistive material of ground pre-alloyed or mixed powders of vanadium and chromium is then evaporated in a vacuum-chamber with a vacuum of about $10^{-6}$ mm. Hg. The evaporation is performed in a tungsten boat at a temperature of between 2000 and 2300° C., which may be achieved by resistance heating. The proportions of the powder mixture may range between 50 and 90 weight percent of chromium and 50 to 10 weight percent of vanadium. The preferred composition consists of 75 weight percent chromium and 25 weight percent vanadium.

During the evaporation, the covered substrate with the terminals and the applied mask is held preferably at a distance of about 9 inches from the tungsten boat. In order to monitor the deposition, a square monitor slide is connected to a digital ohmmeter. The resistive material will be evaporated on this monitoring resistance slide at the same time and at the same rate as on the substrate. By continuously measuring the resistance of the film which is being deposited on the monitor slide, the resistance value of the film resistor being prepared is also made known and the evaporation can be stopped when the desired resistance is reached. To obtain a resistor with 1000 ohms/sq. requires about 1 minute of evaporation. The film of such a resistor will have a thickness of less than 300 Angstrom units. Finally the photoresist and excess resistor metal is removed.

Preferably, the thin metallic resistor film is covered with a layer 17 of silicon monoxide immediately after it has been evaporated. The SiO layer functions as an "overcoat" to reduce oxidation and improves the stability of the resistor.

Figure 3:
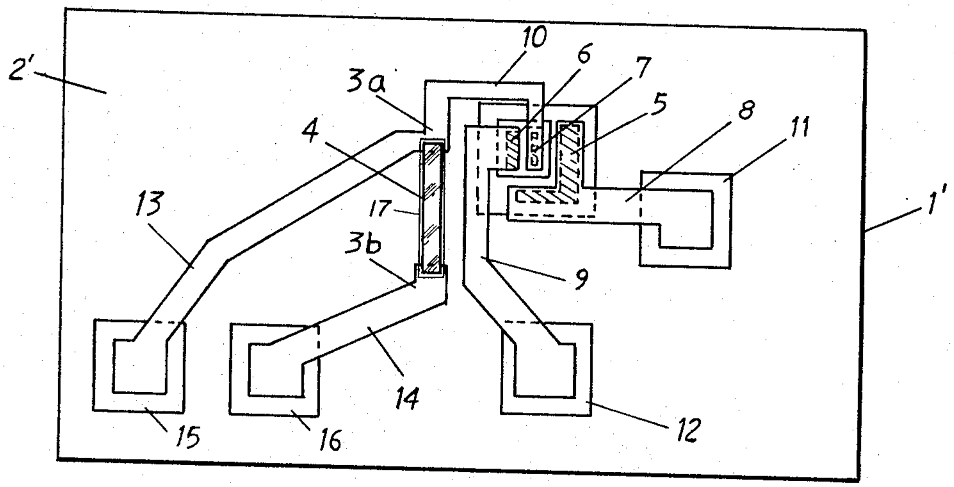
FIGURE 3 is a plan view of a part of an integrated circuit chip incorporating the resistive element of FIGURES 1 and 2.

FIGURE 3 shows how a thin film resistor 4 may be included in an integrated circuit.

The base, emitter and collector impurities are diffused into the semiconductive substrate 1′ which is covered by the insulating layer 2′. Connections are made through the layer 2′ to collector, base and emitter regions (not shown) by terminals 5, 6 and 7, respectively. Interconnecting films 8, 9 and 10 of relatively low resistance are laid on top of layer 2′ and serve to connect terminals 5, 6, and 7 to external connection tabs 11, 12 and to the resistor terminal **3*a*, (an end portion of the interconnecting film 10), respectively. The resistor terminals 3*a* and 3*b* are connected by interconnecting films 13 and 14 to external connection tabs 15 and 16**, respectively.

The invention has a number of advantages over the prior art: The chromium-vanadium alloy is a high resistivity material capable of providing thin film resistors of 1000 to 5000 ohms/sq., compared with only 200 ohms/sq. for evaporated Nichrome on glass. In order to get a high value Nichrome resistor, the Nichrome film has to be so thin that it becomes unstable. This characteristic results in a small physical area required for the chromium-vanadium resistor. Since the resistor of the invention needs only ⅙ of the surface area of the Nichrome resistor, it provides an important space saving.

Furthermore, the chromium-vanadium resistor has a low negative resistance temperature coefficient of only 50 p.p.m./° C. and the invention provides the possibility of varying the value of the negative resistance temperature coefficient by varying the evaporation time or the chromium-vanadium proportions. An evaporation time of 1 minute results in a low resistance temperature coefficient of 50 p.p.m./° C. A longer evaporation time results in a higher negative resistance temperature coefficient, since the two metallic constituents are able to separate and deposit at different rates during this time. This is of interest in cases where the value of the resistance temperature coefficient is not important. A lower chromium percentage also results in an increase of the negative resistance temperature coefficient. A reduction of the chromium percentage from 75 to 50 weight percent increases the coefficient about 20%, a further reduction from 50 to 25 percent further increases the coefficient about 400%.

Since thin film chromium-vanadium resistors can be monitored during evaporation, their absolute value can be controlled better than that of diffused resistors; i.e., ±5 percent as opposed to ±20 percent, thereby providing a higher accuracy of manufacture. The chromium-vanadium resistor shows a high stability during operating: e.g., a 1000 ohms/sq. resistor changes its value less than 1 percent in 1000 hours operating life at 125° C. with 200 watts per square inch power load.

The above-described method of manufacture results in a low capacitance to the substrate, through the silicon dioxide insulating layer, instead of a relatively high capacitance requiring reverse bias inherent with diffused resistors. This advantage results in improved circuit time constants.

Finally, it should be noted that the invention requires no higher costs of manufacture because the same apparatus and technical knowledge are required as for Nichrome resistor production.

What is claimed is:

1. A resistive circuit component comprising
(a) a substrate having a surface composed of an electrically insulating material, and
(b) said surface bearing thereon a film of chromium and vanadium.

2. A resistive circuit component comprising:
(a) a substrate having a surface camposed of a material selected from the group consisting of glass and $SiO_2$,
(b) said surface bearing thereon a film of predetermined shape and a thickness less than 300 Angstrom units composed of an alloy of chromium and vanadium.

3. A high value resistive circuit component comprising:

(a) a substrate having a surface composed of a material selected from the group consisting of glass and $SiO_2$,
(b) said surface bearing thereon a film of predetermined shape and a thickness less than 300 A. composed of an alloy of chromium and vanadium, said film being covered by a thin coating consisting essentially of SiO.

4. An integrated circuit having a plurality of microminiature components, which include a passive component comprising a relatively thin film of an alloy of chromium and vanadium on a substrate having a surface composed of electrically insulating material, and electrical connections between said passive component and other components of said circuit.

5. An integrated circuit having a plurality of microminiature components, which include a high value resistive element comprising a film of predetermined shape and a thickness less than 300 A. composed of an alloy of chromium and vanadium, said thin film being evaporated on a substrate having a surface composed of a material selected from the group consisting of glass and $SiO_2$, and electrical connections between said high value resistive element and other components of said circuit.

6. An integrated circuit having a plurality of microminiature components, which include a high value resistive element comprising a film of predetermined shape and a thickness less than 300 A. composed of an alloy of chromium and vanadium, said thin film being evaporated on a substrate having a surface composed of a material selected from the group consisting of glass and $SiO_2$, said film being covered by a thin coating consisting essentially of SiO, and electrical connections between said high value resistive element and other portions of said circuit.

References Cited

UNITED STATES PATENTS

| | | | |
|---|---|---|---|
| 3,252,831 | 5/1966 | Ragan | 338—308 |
| 3,266,005 | 8/1966 | Balde et al. | 338—308 |
| 2,030,229 | 2/1936 | Schwarzkopf | 75—176 X |
| 2,160,659 | 5/1939 | Hensel | 75—176 X |
| 2,885,310 | 5/1959 | Olson et al. | 117—227 |
| 3,131,059 | 4/1964 | Kaarlela | 75—176 |

FOREIGN PATENTS

| | | |
|---|---|---|
| 607,968 | 11/1960 | Canada. |

OTHER REFERENCES

Electronic Engineering, September 1963, pp. 588–594.

ROBERT K. SCHAEFER, *Primary Examiner.*

W. GAVERT, *Assistant Examiner.*